Patented July 29, 1947

2,424,883

UNITED STATES PATENT OFFICE 2,424,883

PARAFORMALDEHYDE MODIFIED REACTION PRODUCTS OF DIISOCYANATES WITH LINEAR POLYESTER POLYAMIDE

Bernard James Habgood, David Augustine Harper, and Reginald John William Reynolds, Blackley, Manchester, England, assignors to Imperial Chemical Industries Limited, a corporation of Great Britain No Drawing. Application November 20, 1942, Serial No. 466,356. In Great Britain October 14, 1941

13 Claims. (Cl. 260—67)

This invention relates to a treatment of polymeric materials, more particularly to a process whereby polymeric materials of the kind hereinafter described are treated with formaldehyde or with a formaldehyde-liberating substance, and to the production of articles, especially petrol-resistant articles, from the so treated polymeric materials.

It has already been proposed to manufacture polymeric materials by heating together polyester-forming ingredients in the presence or absence of polyamide-forming ingredients. For instance, such polymeric materials are obtained by heating a glycol and/or an aminoalcohol with a dibasic carboxylic acid, optionally in the presence of one or more additional ingredients, namely, a diamine, an aminocarboxylic acid or a hydroxycarboxylic acid; alternatively, one or more of the ingredients may be used in the form of the corresponding ester- or amide-forming derivatives. In order to obtain linear polymers, the amounts of the various ingredients are selected so that there are present approximately chemically equivalent proportions of their complementary ester-forming groups and also of their complementary amide-forming groups, if amide-forming ingredients are used. The linear polyesters or the linear polyester-amides which may be obtained in this way are usually soft, waxy materials with a relatively low molecular weight.

It has been proposed to convert these soft, waxy, low molecular weight, linear polymers into tough polymers of considerably higher molecular weight by heating them with small proportions of an organic diisocyanate, for example, hexamethylene diisocyanate. Furthermore, it has been proposed so to treat such low molecular weight linear polymers which have been obtained by reacting the several ingredients in such proportions that there is present in the reaction mixture a small excess of an alcoholic hydroxyl-containing ingredient over and above that theoretically required. If just sufficient of the diisocyanate to react with the end groups in the low molecular weight linear polymers is used in their conversion into the high molecular weight polymers, there are obtained linear polymers which can be extruded into cold-drawable filaments. However, if greater proportions of the diisocyante are used, there are obtained, tough, rubbery, partly cross-linked, high molecular weight polymers which cannot be extruded into cold-drawable filaments. Whatever proportions of the diisocyanate are reacted with the linear polyester or polyesteramides, we shall refer to the resulting polymers collectively as organic diisocyanate modified polyesters or polyesteramides, and it is with these modified polymers that the present invention is concerned. The polymers modified with diisocyanates may be polyesters having no recurring intralinear carbonamide groups or they may be polyester-amides having a ratio of intralinear ester to carbonamide groups of 1:1 as in the case of polyesters made from dibasic acid and ethanolamine or having a higher ratio of ester to amide groups.

We have now found that heating organic diisocyanate modified polyesters or polyester-amides with paraformaldehyde strikingly alters and improves their physical properties, especially their rubber-like properties. For instance, the polymers become endowed with an increased resilience, a decreased permanent set, an increased softening point and usually with an increased resistance to swelling by or solution in solvents, for example, mixtures of benzene with ethanol, methyl ethyl ketone, and mixtures of methyl ethyl ketone with carbon tetrachloride.

We have also found that the organic diisocyanate modified polyesters or polyester-amides which have been heated with paraformaldehyde are particularly suitable for the construction of petrol-resistant articles, more especially flexible petrol-resistant articles, and that these articles do not have the drawbacks associated with those fabricated from other synthetic rubber-like materials, which are often swollen by or dissolved in petrol, or which, even if they are resistant to petrol, have poor physical properties such as low tensile strength, poor resilience and excessive permanent compression set.

According to the present invention we provide a process for improving the properties of organic diisocyanate modified polyesters or polyester-amides which comprises heating an intimate mixture of said polymer and paraformaldehyde until the desired improvement in properties is obtained. Also, according to the invention we provide articles, especially flexible petrol-resistant articles, comprising the so improved polymers.

The heating of the intimate mixture of polymer and paraformaldehyde will usually be referred to herein as curing.

In operating the process in accordance with the invention, it is preferred, although it is not essential, to effect the curing in the presence of an acid, an acid anhydride or an acid-reacting salt, which materials function as catalysts insofar as they increase the speed of interaction of the polymers with the paraformaldehyde, thereby enabling the desired improvement in properties to be effected at a lower temperature or in a shorter time than would otherwise be possible. Further, when the polymers are cured in the presence of these catalysts, the change of properties due to curing is more pronounced than when no catalyst is present.

As acids there may be used, for example, organic acids such as formic, glycollic, oxalic, succinic, maleic, adipic, tartaric, salicylic, anthranilic, phthalic, citric and tannic acids, and inorganic acids such as boric and phosphoric acids. As acid anhydrides there may be used, for example, phthalic and maleic anhydrides or functional derivatives of these, for example, phthalimide. As acid-reacting salts there may be used, for example, potassium or sodium dihydrogen phosphate.

A stabiliser or anti-oxidant may also be included among the ingredients. Stabilisers or anti-oxidants which have been found to be suitable include, hydroquinone, N:N'-hexamethylene-bis-ortho-hydroxy-benzamide, N-phenyl-α-naphthylamine, N-phenyl-β-naphthylamine, α:α-bis-(2-hydroxy-3:5-dimethylphenyl)butane, and other anti-oxidants customarily used in rubber technology. Some of these materials, which are basic in nature, may retard curing; frequently, however, this can be obviated by using a larger proportion of the acid, acid anhydride or acid reacting salt than would otherwise be used.

Excellent results have been obtained by using from 5 to 15 parts of paraformaldehyde and from 0.5 to 2.5 parts of an acid or acid anhydride or acid-reacting salt per 100 parts by weight of the polymer. Similar results have been obtained by using also from 0.5 to 5 parts of a stabiliser or anti-oxidant per 100 parts by weight of the polymer.

In carrying the process of the invention into practical effect, the several ingredients are mixed together, conveniently on a rubber mill. The milling may be conducted at ordinary or elevated temperatures, depending on the aptitude of the polymer for milling. The temperature is not allowed to become so high, usually not higher than 70° C., as to cause appreciable interaction between the polymer and the paraformaldehyde on the mill. Usually, the milling is continued only for as long as is required to give a satisfactory dispersion of the ingredients, since milling for prolonged periods of time may cause changes in the physical properties of the polymer.

As well as the ingredients already mentioned, one or more additional ingredients may also be used. These include fillers, for example carbon black, clay, asbestos, blanc fixe, whiting, lithopone and mica; other plastic materials, for example, natural or synthetic rubbers, vulcanised vegetable oils, dark substitute, white substitute, coumar gum, wood rosin, and pitch; de-tackifying agents, that is to say materials which reduce the tendency of the mix to stick to the rolls, for example, stearic acid, paraffin wax, oleic acid, lauric acid and dibutyl ammonium oleate; plasticisers, for example, tricresyl phosphate, dibutyl phthalate, butylphthalyl butyl glycollate, and N-alkyltoluenesulphonamides. Small quantities of pigments, for example from 1-3% by weight, such as are customarily used in rubber technology may also be used to impart colour. The additional ingredients may be added when convenient during the mixing, but, care should be taken to avoid using large amounts of ingredients which are basic in reaction since, as said already, such materials may retard curing.

When the ingredients are mixed together, the mix is removed from the mill, if desired formed into shapes or spread or calendered on to a substrate, for example, on to the surface of a fabric, and then cured by heating, for example, in a press or mould or in hot air.

The temperature and time of curing will vary with the nature of the polymer and the catalyst being used. Periods of time of not more than one hour at temperatures of about 100-150° C. are usually suitable for the curing.

If desired, to facilitate the shaping or spreading, organic solvents or swelling agents may be incorporated with the mix; these are removed prior to or during the curing. Particularly suitable for this purpose are mixtures of benzene with ethanol, mixtures of chloroform with methanol, and methyl ethyl ketone. The solvent or swelling agents are used in amounts sufficient to convert the mix into a dough of a consistency convenient for the shaping or spreading.

A variety of articles may be constructed from the organic diisocyanate modified polyesters or polyesteramides improved by curing in accordance with this invention. In the construction of these articles the improved polymers may be supported on a substrate and/or interspersed with a filler. For instance, the improved polymers may be used in the construction of petrol and/or oil resistant articles of all kinds, for example, gaskets, packings, hose, diaphragms for pumps and the like, as well as in the fabrication of flexible containers. They may also be used in the manufacture of rollers, blankets and stereos for use in the printing industry, or to provide protective sheathings for insulated electric cables. They also find application in the construction of balls for games, tyres, elastic threads, conveyor or transmission belting, engine bearings, coated or impregnated fabrics including protective clothing and floor coverings, and generally in the construction of articles requiring the use of a material having physical properties resembling those of rubbers but also having an outstanding resistance to the action of organic fluids and a very low permeability to gases and vapours.

As polyester- and polyester-amide-forming reactants suitable for making the soft, waxy, low molecular weight, linear polymers, which are used in making the starting materials for this invention, there may be used glycols, for example, ethylene glycol, diethylene glycol, triethylene glycol, trimethylene glycol, pentamethylene glycol, hexamethylene glycol, decamethylene glycol, dodecamethylene glycol, 1:12-octadecanediol, and pentaglycol; aliphatic or aromatic aminoalcohols preferably having two hydrogen atoms attached to the amino nitrogen atom and preferably containing a saturated aliphatic chain of at least two carbon atoms separating the amino and hydroxyl groups, for example, mono-ethanolamine and 3-amino-propanol; dibasic carboxylic acids or ester-forming derivatives thereof, preferably saturated or unsaturated aliphatic dicarboxylic acids, for example, malonic, succinic, gluatric, suberic, azealic, β-methyladipic, adipic, pimelic, undecanedioic, brassylic, isophthalic, hexahydroterephthalic, p-phenylenediacetic, dihydromuconic, and acetone-dicarboxylic acids; diamines such as ethylenediamine, hexamethylenediamine, 3-methylhexamethylenediamine, decamethylenediamine and m-phenylenediamine; monohydroxymonocarboxylic acids or their esterforming derivatives, for example, glycollic, 6-hydroxycaproic, 10-hydroxydecanoic and 12-hydroxystearic acids; polymerizable monoaminomonocarboxylic acids or their amide-forming derivatives, for example, 6-aminocaproic acid or its amide-forming derivative caprolactam, 9-aminononanoic, 11-aminoundecanoic and 12-aminostearic acids. Of these, mixtures of glycols, dibasic carboxylic acids and aminoalcohols or diamines are preferred.

The low molecular weight linear polymers are made by heating the selected ingredients at polymerizing temperatures, usually in the absence of air or oxygen, under conditions whereby water is removed from the reaction mixture. When using a diamine as one of the ingredients, it is convenient to use it as the corresponding diammonium salt formed from some of the dibasic carboxylic acid to be used.

The low molecular weight linear polymers are converted into the high molecular weight polymers, that is to say the organic diisocyanate modified polyesters or polyester-amides, by mixing them, for example, by stirring, milling or kneading, with the organic diisocyanate and heating the mixture, for example, to a temperature of 120–200° C. for a period of about 10–120 minutes. Up to about 10 per cent and usually between 3 and 7 percent by weight of the diisocyanate is used.

Before reacting the low molecular weight linear polymers with the organic diisocyanate they may be mixed with what have been described as reactive modifying agents. These mixtures, when treated with an organic diisocyanate, form an interpolymer insofar as the reactive modifying agent and the polymer become chemically united by reaction with the diisocyanate. The reactive modifying agents are materials containing reactive hydrogens and they include cellulose acetate, cellulose nitrate, cellulose ethers, viscose, casein, zein, soya protein, polyvinyl alcohol and wood flour. It is intended that these mixtures of the low molecular weight linear polymers and the reactive modifying agents which have been reacted with an organic diisocyanate shall be included among the materials which are to be improved in accordance with this invention. The low molecular weight linear polymers may also be mixed with non-reactive modifying agents before reacting with the diisocyanate. The non-reactive modifying agents are materials which do not react with diisocyanates and they include carbon black, clay, mica, asbestos and whiting, as well as plastic materials and plasticizers containing no groupings which react with diisocyanates.

Examples of organic diisocyanates which may be used in making the organic diisocyanate modified polyesters or polyester-amides include ethylene diisocyanate, trimethylene diisocyanate, tetramethylene diisocyanate, hexamethylene diisocyanate, decamethylene diisocyanate, m-phenylene diisocyanate, benzidine diisocyanate, naphthalene diisocyanates and adipyl diisocyanate. Of these, the aliphatic diisocyanates, especially hexamethylene diisocyanate, are preferred.

The invention is illustrated by the following examples, in which the parts are expressed by weight, unless otherwise stated:

*Example 1*

100 parts of a diisocyanate modified polyesteramide, 10 parts of paraformaldehyde, 2 parts of anhydrous sodium dihydrogen phosphate and 2 parts of hydroquinone are milled together on a two roll rubber mill at a temperature of 50° C. for about 15 minutes, that is until the ingredients are thoroughly dispersed. The mixture is removed from the mill and cured in a suitable mould under hydraulic pressure at a temperature of 141° C. for 15 minutes. The mould is cooled whilst under pressure and the cured product is removed.

The cured product is solvent resisting, for example it is not dissolved in benzene-ethanol mixtures (although some swelling takes place), it is not thermoplastic, it has a very low permanent set and a high resilience, and its elastic properties are maintained at least up to 150° C. Some of its physical properties are:

| | |
|---|---|
| Tensile strength | kg./cm.$^2$ 88 |
| Elongation at break | per cent 737 |
| Shore hardness at 20° C. | 30 |
| Shore hardness at 50° C. | 27 |
| Swelling in benzene (2 days at 20° C.) per cent by volume | 80 |
| Swelling in petrol (2 days at 20° C.) per cent by volume | 1 |
| Swelling in lubricating oil (7 days at 70° C.) per cent by volume | 2 |
| Swelling in Diesel oil (7 days at 70° C.) per cent by volume | 3 |

The uncured polymer disintegrates when immersed in a mixture of equal parts of benzene and ethanol (by volume); it is thermoplastic and it has a high permanent set.

The diisocyanate modified polyester-amide used in this example is obtained as follows:

469 parts of ethylene glycol, 1314 parts of adipic acid, 91.5 parts of monoethanolamine and 200 parts of water are mixed together and heated with stirring whilst a stream of nitrogen is passed over the heated mixture, the temperature being raised during two hours to 170° C. The mixture is maintained at 170° C. for seven hours, after which time the distillation of water ceases. The temperature is raised to 180–190° C., the blanket of nitrogen being still maintained, and xylene is added continuously and distilled to remove all traces of water as a water-xylene azeotropic binary. After 36 hours the xylene distillate is clear, indicating the removal of all traces of the water. The mixture is now heated for 3 hours at 180–190° C. in vacuo (20 mm./Hg) to remove the xylene. There is thus obtained a thick syrup which gradually crystallises on standing and which has an acid value of 16 mgm. KOH per gm. 1318 parts of this syrup are put into a steam heated internal-mixer and the temperature is raised to 130–140° C. 61½ parts of hexamethylene diisocyanate are then added, in small portions during one hour, whilst the temperature of the mixer is gradually raised to 170° C. The syrup gradually thickens to a tough, rubbery mass. The mixer is cooled to 100–130° C. and the so-obtained diisocyanate modified polyester-amide is removed.

Example 2

100 parts of a diisocyanate modified polyester-amide, 2.5 parts of paraformaldehyde, 1 part of stearic acid and 2 parts of hydroquinone are milled together on a two-roll rubber mill at a temperature of 60–70° C. for 15 minutes, that is, until the ingredients are fully dispersed. The mixture is removed from the mill and cured in a suitable mould under hydraulic pressure at a temperature of 134° C. for 25 minutes. The mould is cooled whilst under pressure and the cured product is removed.

The product is solvent resisting, for example it is not dissolved in benzene ethanol mixtures (although some swelling takes place), it is not thermoplastic, it has a very low permanent set and a high resilience, and its elastic properties are maintained at temperatures even higher than 150° C. Some of its physical properties are:

Tensile strength_____kg./cm.$^2$__ 108
Elongation at break_____per cent___ 683
Shore hardness at 50° C_____ 24
Swelling in benzene (2 days at 20° C.)
 per cent by volume__ 70
Swelling in petrol (2 days at 20° C.)_____ Nil
Swelling in lubricating oil (7 days at 70° C.)
 per cent by volume__ 1
Swelling in Diesel oil (7 days at 70° C.)
 per cent by volume__ 2

The uncured polymer disintegrates when immersed in a mixture of equal parts of benzene and ethanol (by volume), it is thermoplastic and can be cold-drawn.

The diisocyanate modified polyester-amide used in this example is obtained as follows:

818 parts of adipic acid, 351 parts of ethylene glycol, 205 parts of hexamethylene diammonium adipic and 100 parts of water are heated at a temperature of 220° C., whilst a stream of nitrogen is passed over the surface of the heated mixture, until no more water distils from the mixture. Continuous azeotropic distillation with xylene is then carried out at 200° C. for 24 hours, after which time all the water is removed, and the xylene is then removed by heating in vacuo (15 mm./Hg) for 3 hours. After cooling, there is obtained a white wax with an acid value of 26.3 mgm. KOH per gm. 1333 parts of this wax are charged into a steam heated internal-mixer and the temperature is raised to 125–130° C. 69½ parts of hexamethylene diisocyanate are then added in small portions during 1 hour, whilst the temperature of the mixer is gradually raised to 150–170° C. The mixture gradually thickens to a thick viscous mass which, after milling for a short time after the addition of all of the diisocyanate, forms a tough rubbery material. The mixer is cooled to about 100–130° C. and the so-obtained diisocyanate modified polyester-amide is removed.

If desired in working the recipe of this example, the heating in vacuo to remove the last traces of xylene can be omitted, as the greater proportion of the xylene is removed by distillation at ordinary pressures, the residual traces having no effect on the properties of the final product.

Example 3

100 parts of a diisocyanate modified polyester-amide, 10 parts of paraformaldehyde, 2 parts of sodium dihydrogen phosphate and 2 parts of hydroquinone are cured in the manner described in Example 2. The resulting cured polymer is more elastic and less plastic, and has a better oil resistance and a lower permanent set than the uncured polymer.

The diisocyanate modified polyester-amide, used in this example, is obtained by treating 350 parts of the waxy material, prepared from ethylene glycol, adipic acid and hexamethylenediammonium adipate as described in Example 2, in a Banbury-type mixer with 16.35 parts of m-phenylene diisocyanate at a temperature of 125–150° C. until a tough rubbery material is obtained.

Example 4

The following mixes are made up on a two-roll rubber mill, the components being added in the order listed. The compounding takes 20–30 minutes. Cooling water is passed through the rolls so that the temperature of the mix is maintained at 50–65° C. during the compounding.

|  | A | B |
| --- | --- | --- |
|  | Parts | Parts |
| Diisocynate modified polyester-amide | 100 | 100 |
| Hydroquinone | 3 | 3 |
| Carbon black |  | 30 |
| Stearic Acid | 0.5 | 0.5 |
| Paraformaldehyde | 10 | 10 |
| Phthalic anhydride | 1.0 | 1.5 |

The mixes are removed from the mill and cured for 15 minutes at 141° C. in a suitable mould under hydraulic pressure to give sheets 4 mm. thick.

For purposes of comparison, moulded sheets of the uncured material are also prepared by compounding the following components in the order given:

|  | C | D |
| --- | --- | --- |
|  | Parts | Parts |
| Diisocyanate modified polyester-amide | 100 | 100 |
| Hydroquinone | 3 | 3 |
| Carbon black |  | 30 |
| Stearic acid | 0.5 | 0.5 |

These mixes are removed from the mill and heated for 5 minutes at 141° C. in a suitable mould under hydraulic pressure to give sheets 4 mm. thick.

The uncured polymer has high permanent set and is thermoplastic at 50° C. The cured polymer has a greatly reduced permanent set and shows no signs of softening even at 120° C. It is highly resilient up to this temperature and even at 20–30° C. higher.

A comparison of the physical properties of the cured and uncured sheets is given in the following table:

|  | A | C | B | D |
| --- | --- | --- | --- | --- |
| Tensile strength, kg./cm.$^2$ | 84 | 112 | 150 | 194 |
| Elongation at break, per cent | 673 | 547 | 520 | 533 |
| Shore hardness at 50° C | 31 | (¹) | 39 | (¹) |
| Resilience at 50° C., per cent | 58.0 | (¹) | 45.8 | (¹) |
| Permanent set after 100% stretch, per cent | 3.2 |  | 30.4 | 62.4 |
| Permanent set after compression, per cent— |  |  |  |  |
| at 25° C |  | 3 |  | 6 |
| at 50° C |  | 50 |  | 29 |
| at 100° C | 100 | (¹) | 100 | (¹) |

¹ Too soft to measure.

The diisocyanate modified polyester-amide used in this example is obtained as follows:

46.2 parts of epsilon-aminocaproic acid, 12.5 parts of ethylene glycol, 292 parts of adipic acid and 60 parts of water are heated together with stirring under a stream of nitrogen, the temperature being raised to 170° C. during 3 hours. The temperature is then raised to 200° C. in 1 hour and xylene is added. Continuous azeotropic distillation of the xylene is maintained for 30 hours, xylene being added as required, after which time the condensate has an acid value of 32 mgm. KOH per gm. A further 15 parts of ethylene glycol is added to the condensate, and the mixture is heated at 200° C. for a further 23 hours the azeotropic distillation with xylene being maintained. The mixture is then heated at 200° C. for a further 2 hours under conditions such that the majority of the xylene is removed. On cooling, a soft, grey wax with an acid value of 14.2 mgm. KOH per gm. is obtained.

300 parts of this wax are treated in a steam-heated internal mixer at 145° C. with 15 parts of hexamethylene diisocyanate (added in 3 portions at 15 minute intervals). The so-obtained diisocyanate modified polyester-amide is a soft rubber-like material.

*Example 5*

Mixes of the following components are made up and cured or heated in the form of sheets 4 mm. thick in the manner described in Example 4.

|  | A | B | C |
|---|---|---|---|
| Diisocyanate modified polyesteramide parts.. | 100 | 100 | 100 |
| Hydroquinone............do.... | 2 | 2 | 2 |
| Carbon Black............do.... |  | 60 | 60 |
| Paraformaldehyde........do.... | 8 | 8 |  |
| Phthalic anhydride......do.... | 0.75 | 0.75 |  |
| Time of curing..........min.. | 30 | 30 |  |
| Time of heating.........do.... |  |  | 5 |

A comparison of the physical properties of the cured and uncured sheets is given in the following table:

|  | A | B | C |
|---|---|---|---|
| Tensile strength, kg./cm.² | 40 | 190 | 10 |
| Elongation at break, per cent | 407 | 553 | 800 |
| Shore hardness at 25° C. | 29 | 51 | + |
| Permanent set after 200% stretch, per cent. | 9.4 | 6.1 | 58.4 |
| Resilience at 50° C., per cent. | 62.8 | 63.8 | (¹) |
| Modulus at 300% extension | 20 | 22 |  |
| Permanent set after compression, per cent: |  |  |  |
| at 25° C. | (²) | (²) | 71 |
| at 100° C. | 10 | 10 | (¹) |

¹ Too soft to measure.
² Less than 10.

The diisocyanate modified polyester-amide used in this example is obtained as follows:

127.75 parts of adipic acid, 42.25 parts of ethylene glycol and 13.6 parts of monoethanolamine are heated together under carbon dioxide to 190° C. during 17 hours, and the mixture is then subjected to continuous azeotropic distillation with xylene at 180–190° C. for 22 hours. Most of the xylene is then removed by distillation at 185° C. A pale yellow syrup with a melt viscosity of 68 poises at 75° C. and an acid value of 9.6 mgm. KOH per gm. is obtained. This syrup slowly hardens to a soft, cream-coloured wax. The wax is treated with 4–5% of hexamethylene diisocyanate in the manner described in Example 4. The so obtained diisocyanate modified polyester-polyamide is a soft rubber-like material which does not harden on standing.

*Example 6*

The following mixes are made up in the manner described in Example 4:

|  | A | B |
|---|---|---|
|  | Parts | Parts |
| Diisocyanate modified polyester-amide | 100 | 100 |
| Hydroquinone | 3 | 3 |
| Carbon black | 30 | 30 |
| Stearic acid | 0.5 | 0.5 |
| Paraformaldehyde | 7.5 | 7.5 |
| Phthalic anhydride | 0.5 | 1.0 |

The mixes are removed from the mill and cured for 15 minutes at 141° C. in a suitable mould under hydraulic pressure to give sheets 4 mm. thick.

For purposes of comparison, moulded sheets of the uncured material are also prepared by compounding the following components:

|  | C |
|---|---|
|  | Parts |
| Diisocyanate modified polyester-amide | 100 |
| Hydroquinone | 2 |
| Carbon black | 30 |
| Stearic acid | 0.5 |

The mix is removed from the mill and heated for five minutes at 141° C. in a suitable mould under hydraulic pressure to give a sheet 4 mm. thick.

A comparison of the physical properties of the cured and uncured sheets is given in the following table:

|  | A | B | C |
|---|---|---|---|
| Tensile strength, kg./cm.² | 108 | 92 | 81 |
| Elongation at break, per cent | 487 | 380 | 650 |
| Shore hardness at 50° C. | 40 | 41 | (¹) |
| Resilience at 50° C., per cent | 51.3 | 56.2 | (¹) |
| Swelling in benzene-ethanol (equal volumes), 2 days at 25° C., percent by volume | 214 | 193 | (²) |

¹ Too soft to measure.
² Disintegrates.

The diisocyanate modified polyester-amide used in this example is obtained as follows:

262 parts of ethylene glycol, 255 parts of monoethanolamine, 1221 parts of adipic acid and 200 parts of water are reacted together by the method described in Example 4. A brown syrup with an acid value of 15.8 mgm. KOH per gm. is obtained.

The syrup is treated with 4.15% of hexamethylene diisocyanate in the manner described in Example 4. The so-obtained diisocyanate modified polyester-amide is a soft rubber-like material which does not harden on standing at room temperatures.

*Example 7*

Mixes of the following components are made up and cured or heated in the form of sheets 4 mm. thick in the manner described in Example 4:

|  | A | B | C |
|---|---|---|---|
| Diisocyanate modified polyester-amide parts.. | 100 | 100 | 100 |
| Hydroquinone............do.... | 2 | 2 | 2 |
| Carbon black............do.... |  | 30 | 30 |
| Paraformaldehyde........do.... | 10 | 10 |  |
| Phthalic anhydride......do.... | 1 | 1.5 |  |
| Time of curing..........mins.. | 15 | 15 |  |
| Time of heating.........do.... |  |  | 5 |

A comparison of the physical properties of the cured and uncured sheets is given in the following table:

|  | A | B | C |
|---|---|---|---|
| Tensile strength, kg./cm.² | 12 | 42 |  |
| Elongation at break, per cent | 53 | 120 |  |
| Shore hardness at 50° C | 50 | 60 | (¹) |
| Resilience at 50° C | 56.5 | 49.4 | (¹) |
| Swelling in benzene-ethanol (equal volumes), 2 days at 25° C., per cent by volume | 134 | 129 | (²) |

¹ Too soft to measure.
² Dissolves.

The uncured sheet becomes hard and stiff on standing at room temperature; it softens at about 35–40° C. to a plastic material. The cured sheets do not soften even at 100° C. and they are resilient and rubbery in feel.

The diisocyanate modified polyester-amide used in this example is obtained as follows:

A mixture of 274.8 parts of monoethanolamine, 657.4 parts of adipic acid and 10 parts of water is heated to 170° C. over 2¼ hours. The resulting syrup, which has an acid value 92 of mgm. KOH per gm., is heated at this temperature whilst the pressure is lowered gradually to 1 mm. during 6 hours. After heating at 170° C. for a further hour, followed by cooling, a tough, brown wax with an acid value of 37 mgm. KOH per gm. is obtained.

The wax is converted into a tough rubbery diisocyanate modified polyester-amide by treatment with 8% hexamethylene diisocyanate in the manner described in Example 4.

*Example 8*

Mixes of the following components are made up and cured or heated in the form of sheets 4 mm. thick in the manner described in Example 4:

|  | A | B | C | D |
|---|---|---|---|---|
| Diisocyanate modified polyester-amide parts | 100 | 100 | 100 | 100 |
| Hydroquinone do | 3 | 3 | 3 | 3 |
| Stearic acid do |  | 0.5 | 0.5 | 0.5 |
| Carbon black do |  |  | 30 | 30 |
| Paraformaldehyde do | 10 | 10 |  |  |
| Phthalic anhydride do | 1.0 | 1.5 |  |  |
| Time of curing min | 15 | 15 |  |  |
| Time of heating do |  |  | 5 | 5 |

A comparison of the physical properties of the cured and uncured sheets is given in the following table:

|  | A | B | C | D |
|---|---|---|---|---|
| Tensile strength, kg./cm.² | 106 | 114 | 142 | 130 |
| Elongation at break, per cent | 267 | 187 | 325 | 50 |
| Shore hardness at 25° C | 95 | 91 |  |  |
| Resilience at 50° C | 63.5 | 56.5 |  |  |
| Permanent set after 100% stretch | 64.0 | 61.7 |  |  |

The uncured sheets are not thermoplastic even at 100° C., so that the raising of the melting point is not readily detected. At temperatures above 100° C., however, the cured sheets soften less than the uncured sheets. At room temperature, all the sheets are very hard and differences in behaviour only are evident at temperatures of 50° C. or above.

The diisocyanate modified polyester-amide used in this example is obtained as follows:

18.8 parts of monoethanolamine, 93.9 parts of ethylene glycol, 363.6 parts of sebacic acid and 200 parts of water are reacted together in the manner described in Example 4 forming a wax with an acid value of 9.75 mgm. KOH per gm.

The wax is treated with 6% of hexamethylene diisocyanate in an internal mixer at 140–160° C. The so obtained diisocyanate modified polyester-amide is a rubber-like material which hardens on standing at room temperature.

*Example 9*

Mixes of the following components are made up and cured or heated in the form of sheets 4 mm. thick in the manner described in Example 4:

|  | A | B | C |
|---|---|---|---|
| Diisocyanate modified polyester-amide parts | 100 | 100 | 100 |
| Hydroquinone do | 2 | 2 | .2 |
| Carbon black do |  | 30 |  |
| Stearic acid do |  | 0.5 |  |
| Paraformaldehyde do | 10 | 10 |  |
| Phthalic anhydride do | 1.0 | 1.5 |  |
| Time of curing min | 15 | 15 |  |
| Time of heating do |  |  | 5 |

A comparison of the physical properties of the resulting cured and uncured sheets is given in the following table:

|  | A | B | C |
|---|---|---|---|
| Tensile strength, kg./cm.² | 14 | 52 | 292 |
| Elongation at break, per cent | 113 | 307 | 810 |
| Shore hardness | 42 | 50 |  |
| Permanent set after 100% stretch, per cent |  | 7.8 | 28.2 |
| Resilience at 50° C | 69.5 | 62.5 | (¹) |
| Swelling in benzene-ethanol (equal volumes), 2 days at 25° C., per cent by volume | 200 | 206 | 640 |

¹ Too soft to measure.

The diisocyanate modified polyester-amide used in this example is obtained as follows:

52.1 parts of decamethylene diamine, 292.4 parts of adipic acid, 106.5 parts of ethylene glycol, and 100 parts of water are heated together under a stream of nitrogen to 170° C. for 3 hours. The temperature is then raised to 200° C. during 1 hour, and the reaction mixture subjected to continuous azeotropic distillation with xylene for 21 hours whilst the temperature is maintained at 190–200° C. The acid value of the product is then 31 mgm. KOH per gm. This is reduced to 9.4 by adding a further 15 parts of ethylene glycol and continuing the azeotropic distillation for a further 14 hours. Xylene is then distilled off by heating the mixture at 200° C. for 3 hours. On cooling, a wax is obtained.

This wax is converted into a diisocyanate modified polyester-amide by treatment with 5% of hexamethylene diisocyanate in the manner described in Example 4. A rubber-like product is obtained.

*Example 10*

800 parts of the polyester-amide wax described in Example 5 are melted, and there are added 320 parts of carbon black, and the mixture is stirred in a heavy duty internal mixer heated by steam at 120° C. 30 parts of hexamethylene diisocyanate are then added to the mix whilst the heating and stirring are continued. After 25 minutes, the temperature is raised to 135° C., and a further 40 parts of hexamethylene diisocyanate are added in eight portions at 15 minute intervals. A black rubbery mass is obtained.

100 parts of the black rubbery mass is compounded with 2 parts of hydroquinone, 0.5 parts of stearic acid, 7 parts of paraformaldehyde and 1.5 parts of phthalic anhydride. The mix is cured by heating for 35 minutes at 125° C. in a suitable mould under hydraulic pressure to give a sheet 4 mm. thick.

The cured sheet has the following physical properties:

| | |
|---|---|
| Tensile strength (kg./cm.²) | 94 |
| Elongation at break (per cent) | 220 |
| Resilience at 50° C | 50 |
| Modulus: | |
| At 100% extension | 20 |
| At 200% extension | 78 |
| Shore hardness at 25° C | 43 |
| B. S. I. hardness at 25° C | 103 |
| Swelling in benzene—2 days at 25° C. per cent by volume | 48 |

Example 11

3120 parts of the polyester-amide was described in Example 5 are melted, and there are added 468 parts of polyvinyl alcohol. The mixing is carried out in a Banbury-type mixer at a temperature of 80° C. The temperature of the mixer is then raised to 125° C. and 255 parts of hexamethylene diisocyanate are added during 45 minutes. A rubbery mass is obtained. The rubbery mass is then mixed in the Banbury-type mixer at a temperature of 125° C. with 500 parts of the diisocyanate modified polyester-amide described in Example 1. The so obtained material is plastic at 50° C.

Mixes of this material with the following components are then made up and cured for 15 minutes at 141° C. in the form of sheets 4 mm. thick in the manner described in Example 4:

| | A | B |
|---|---|---|
| | Parts | Parts |
| Material obtained as above | 100 | 100 |
| Carbon black | | 60 |
| Paraformaldehyde | 5 | 5 |
| Phthalic anhydride | 1.5 | 1.5 |

A comparison of the physical properties of the cured sheets is given in the following table:

| | A | B |
|---|---|---|
| Tensile strength, kg./cm.² | 62 | 140 |
| Elongation at break, per cent | 367 | 473 |
| Permanent set after 200% stretch, per cent | 7.9 | 7.9 |
| Shore hardness at 25° C | 29 | 61 |

The cured sheets do not soften greatly even at 100° C.

Example 12

339 parts of the polyester-amide wax described in Example 5 are melted and mixed with 51 parts of wood flour in a steam-heated Banbury-type mixer. The temperature is raised to 115–120° C. and 22 parts of hexamethylene diisocyanate are added during 75 minutes. There is obtained a tough rubbery material which is plastic at 50° C.

Mixes of this material with the following components are then made up and cured for 30 minutes at 125° C. in the form of sheets 4 mm. thick in the manner described in Example 4:

| | A | B |
|---|---|---|
| | Parts | Parts |
| Material obtained as above | 100 | 100 |
| Carbon black | | 60 |
| Paraformaldehyde | 10 | 10 |
| Phthalic anhydride | 1.5 | 1.5 |

A comparison of the physical properties of the cured sheets is given in the following table:

| | A | B |
|---|---|---|
| Tensile strength, kg./cm.² | 52 | 84 |
| Elongation at break, per cent | 167 | 93 |
| Shore hardness at 25° C | 51 | 71 |
| Resilience at 50° C | 69.1 | 64.6 |

The cured sheets do not soften below 100° C.

Example 13

400 parts of the polyester-amide (unmodified with hexamethylene diisocyanate) described in Example 1 are melted, there are added 20 parts of cellulose acetate dissolved in 320 parts of acetone, and the mixture is vigorously stirred until homogeneous. The acetone is removed by evaporation and there is thus obtained an intimate blend of the polyester-amide and the cellulose acetate.

350 parts of this blend are treated in a Banbury-type internal mixer with 20 parts of hexamethylene diisocyanate at 120–150° C. A tough, rubber-like material, which softens below 50° C., is obtained.

Mixes of this material with the following components are then made up and cured for 30 minutes at 125° C. in the form of sheets 4 mm. thick in the manner described in Example 4:

| | A | B |
|---|---|---|
| | Parts | Parts |
| Material obtained as above | 100 | 100 |
| Hydroquinone | 2 | 2 |
| Carbon black | | 60 |
| Paraformaldehyde | 10 | 10 |
| Phthalic anhydride | 1.5 | 1.0 |

A comparison of the physical properties of the cured sheets is given in the following table:

| | A | B |
|---|---|---|
| Tensile strength, kg./cm.² | 164 | 180 |
| Elongation at break, per cent | 167 | 287 |
| Shore hardness at 25° C | 70 | 61 |
| Resilience at 50° C | 71.7 | 69.1 |

The cured sheets are not appreciably softened even at 100° C.

Example 14

100 parts of the uncured diisocyanate modified polyester-amide described in Example 1 are compounded on a rubber mill at about 50° C. with 10 parts of paraformaldehyde, 2 parts of hydroquinone, 30 parts of carbon black, 3 parts of anhydrous sodium dihydrogen phosphate and 1 part of stearic acid. When the ingredients are thoroughly mixed, a suitable quantity of the mix is placed in a cup-washer mould (of the type used for moulding rubber), and the mould and contents are then heated under hydraulic pressure at a temperature of 141° C. for 15 minutes.

The moulding is used as a washer in a pump to be used for petrol, lubricating or Diesel oil; it is substantially unaffected by these liquids.

We claim:

1. Process as claimed in claim 9 wherein the heating is effected in the presence of an acidic substance of the class consisting of acids, acid anhydrides and acid reacting salts.

2. Process as claimed in claim 9 wherein there are used from 0.5 to 2.5 parts of an acidic substance of the class consisting of acids, acid anhydrides and acid reacting salts per 100 parts by weight of the reaction product.

3. Process as claimed in claim 9 wherein the diisocyanate modified polymer is mixed with the other process ingredients in a rubber mill.

4. Process as claimed in claim 9 wherein the diisocyanate modified polymer is mixed with the other process ingredients in a rubber mill, then removed therefrom, formed in the desired shape and heated.

5. Process as claimed in claim 9 wherein the polymer is the condensation product of a glycol, a dibasic carboxylic acid and a bifunctional amino compound wherein any function which is not the hydrogen bearing amino function is the alcoholic hydroxyl function.

6. Process as claimed in claim 9 wherein the reaction product is an aliphatic diisocyanate reaction product.

7. Process as claimed in claim 9 wherein the reaction product is a hexamethylene diisocyanate reaction product.

8. Process according to claim 9 wherein the polymer modified by the diisocyanate is a condensation polymer of a dibasic carboxylic acid, a glycol, and a saturated primary monoamino monohydric alcohol.

9. A process comprising intimately mixing a diisocyanate-modified polymer with 2.5 to 15 parts of paraformaldehyde, per 100 parts of the modified polymer, and heating said mixture at 100–150° C. for not more than one hour until the product exhibits increased resilience and increased softening point, said diisocyanate-modified polymer being the reaction product of a soft, waxy, low molecular weight linear polymer and from 3 to 10%, by weight of said waxy polymer, a hydrocarbon diisocyanate, and said waxy polymer being of the class consisting of polyesters containing recurring intralinear carboxylic ester groups and polyester-amides containing recurring intralinear carboxylic ester groups and intralinear carbonamide groups, the ratio of ester to carbonamide groups being at least 1:1.

10. A rubbery, resilient product of the heating at 100–150° C. for not more than one hour of an intimate mixture of 2.5 to 15 parts of paraformaldehyde with 100 parts of the product of the reaction of 3 to 10 parts of a hydrocarbon diisocyanate and 100 parts of a soft, waxy, low molecular weight linear polymer of the class consisting of polyesters containing recurring intralinear carboxylic ester groups and polyester-amides containing recurring intralinear carboxylic ester groups and recurring intralinear carbonamide groups, the ratio of ester to carbonamide groups being at least 1:1.

11. An article coated with the rubbery, resilient material of claim 10.

12. Process for modifying the properties of the reaction product of 3 to 10 parts of a hydrocarbon diisocyanate with 100 parts of a soft, waxy, low molecular weight linear carboxylic acid polyester-carboxylic acid polyamide which has the ester and amide groups in the ratio of at least 1:1 and as recurring intralinear members of the polymer chain which comprises intimately mixing said reaction product with 2.5 to 15%, by weight of said reaction product, of paraformaldehyde and heating said mixture at 100–150° C. until the desired improvement in properties is obtained.

13. A rubbery, resilient product of the heating, at 100–150° C. for not more than one hour, of an intimate mixture of 2.5 to 15 parts of paraformaldehyde with 100 parts of the product of the reaction of 3 to 10 parts of a hydrocarbon diisocyanate and 100 parts of a soft, waxy, low molecular weight linear carboxylic acid polyester-carboxylic acid polyamide which has the ester and amide groups in the ratio of at least 1:1 and as recurring intralinear members of the polymer chain.

BERNARD JAMES HABGOOD.
DAVID AUGUSTINE HARPER.
REGINALD JOHN WILLIAM REYNOLDS.

REFERENCES CITED

The following references are of record in the file of this patent:

UNITED STATES PATENTS

| Number | Name | Date |
|---|---|---|
| 2,241,321 | Schlack | May 6, 1941 |
| 2,282,827 | Rothrock | May 12, 1942 |
| 2,177,637 | Coffman | Oct. 31, 1939 |
| 2,333,917 | Christ et al. | Nov. 9, 1943 |
| 2,333,922 | Foster | Nov. 9, 1943 |
| 1,725,797 | Harvey | Aug. 27, 1929 |